J. B. SARGENT.
FURNITURE CASTER.
No. 105,374.             Patented July 12, 1870.
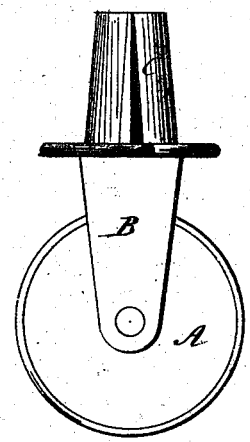
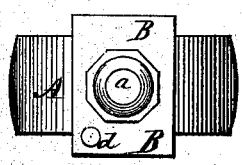
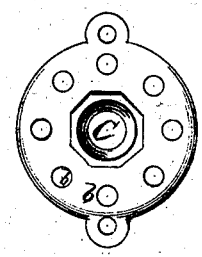
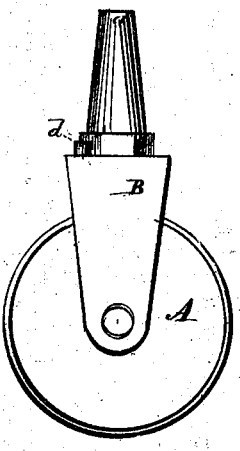

United States Patent Office.

JOSEPH B. SARGENT, OF NEW HAVEN, CONNECTICUT.

Letters Patent No. 105,374, dated July 12, 1870.

IMPROVEMENT IN FURNITURE-CASTERS.

The Schedule referred to in these Letters Patent and making part of the same.

*To all whom it may concern:*

Be it known that I, JOSEPH B. SARGENT, of New Haven, in the county of New Haven and State of Connecticut, have invented a new Improvement in Furniture-Caster; and I do hereby declare the following, when taken in connection with the accompanying drawings and the letters of reference marked thereon, to be a full, clear, and exact description of the same, and which said drawings constitute part of this specification, and represent in—

Figure 1, a side view;

Figure 2, a top view of the caster removed from the socket;

Figure 3, an under-side view of the socket; and in

Figure 4, a side view of the wheel and yoke detached from the socket.

This invention relates to an improvement in that class of casters designed for heavy furniture, as pianos, bedsteads, &c.

In moving such articles of furniture upon casters as heretofore made, that is, hung upon a vertical spindle at one side from the axis, it is well known that after the furniture has been moved in one direction, a sufficient force must be used in returning the furniture to turn the castor around in an opposite direction, and, in doing so, the furniture is unavoidably turned from its course, and great difficulty is experienced in returning it to the desired or original position. By my invention these difficulties are entirely overcome; and It consists in the construction of the spindle or yoke of the caster and socket, so that the caster may be set in any desired position; hence, when the furniture is moved upon the caster from its position, it may be easily returned; the caster always remaining in the position in which it is set.

A is the wheel, hung in a yoke, B, in the usual manner; the said yoke being constructed with a spindle, *a*, or other means, by which it may be set into the socket C, and so that the wheel may be set relative to the socket, in different positions, by preference, eight different positions; and this may be done by an eight-sided stud on the yoke B, and a corresponding seat in the socket, as seen in fig. 3, or by a stud, *d*, on the yoke, and a corresponding perforation in the plate of the socket, as seen in fig. 3.

By this construction the caster may be set relative to the furniture, so as to move it directly forward and back, or to either side and back, or upon an angle of forty-five degrees and back, always returning in the same track and to the point from which it was removed.

I claim as my invention—

In furniture-casters, the yoke and socket constructed and combined with projections and recesses, substantially as described, to set the wheel in different fixed relative positions.

J. B. SARGENT.

Witnesses:
 A. J. TIBBITS,
 J. H. SHUMWAY.